Sept. 12, 1933.  H. FOALE  1,926,480
ELECTRIC SUPPLY SYSTEM
Filed Jan. 23, 1931   3 Sheets-Sheet 1
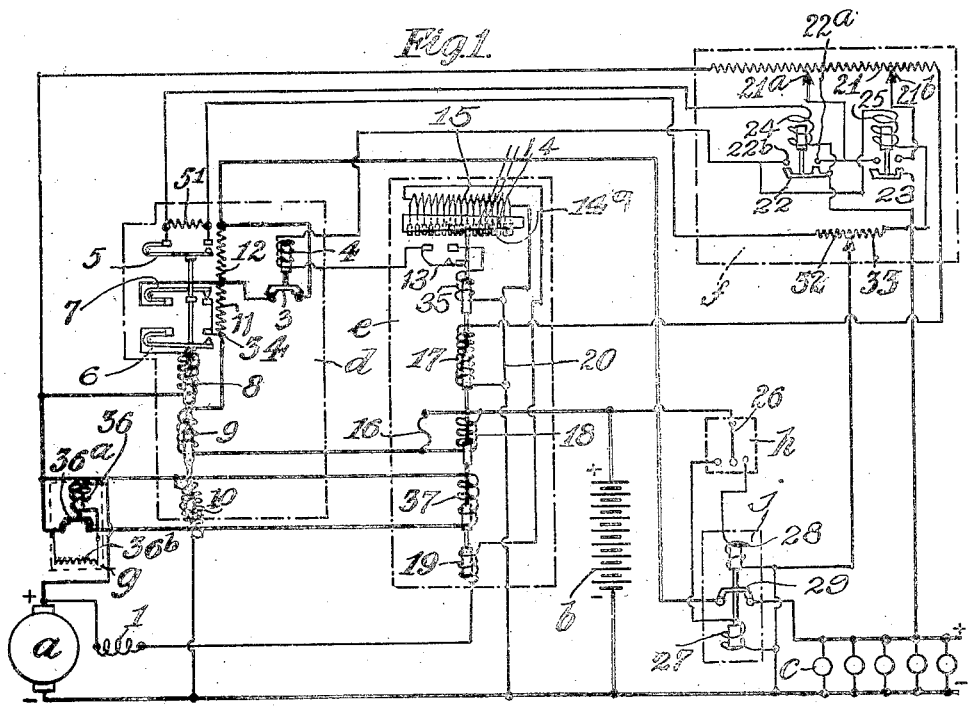
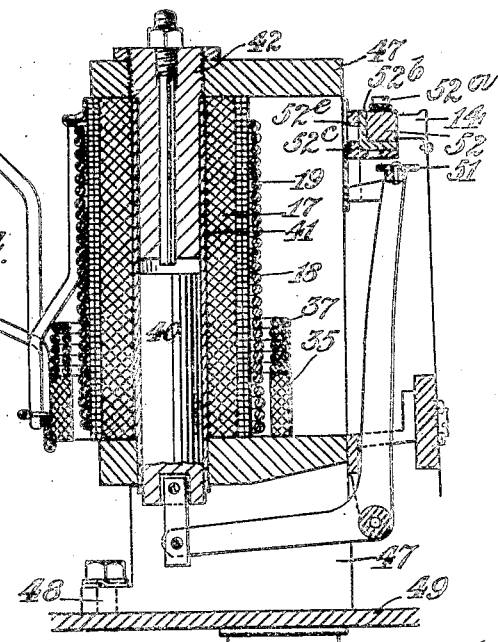
Inventor
Herbert Foale,
By Henry Orth
atty.

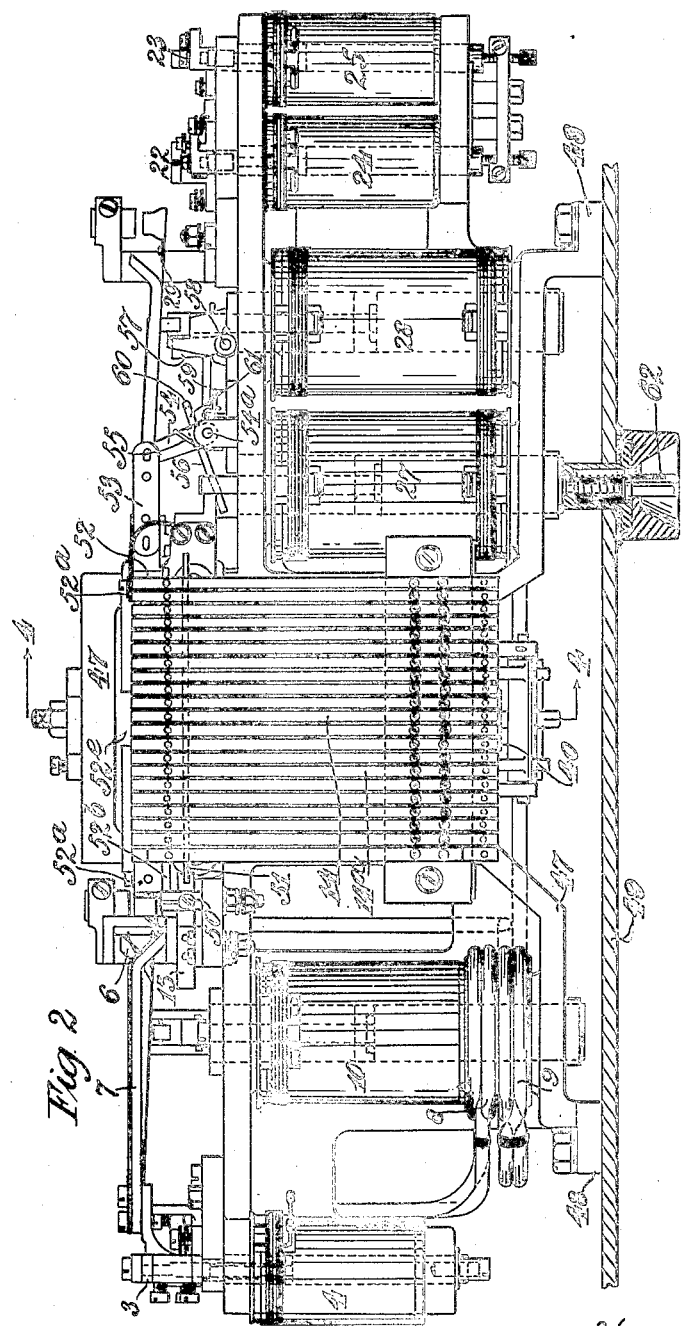

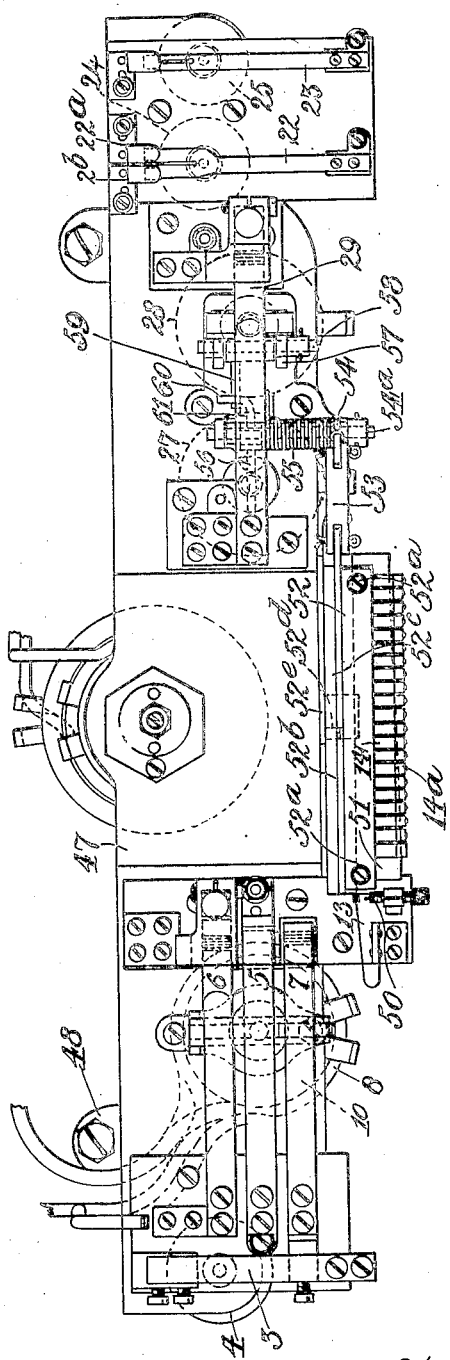

Patented Sept. 12, 1933

1,926,480

UNITED STATES PATENT OFFICE 1,926,480

ELECTRIC SUPPLY SYSTEM

Herbert Foale, Wolverton, England, assignor to J. Stone & Company, Limited, Deptford, England, a company of Great Britain Application January 23, 1931, Serial No. 510,395 and in Great Britain March 1, 1930

13 Claims. (Cl. 171—313)

This invention relates to electrical installations, particularly train lighting installations in which the conditions make it difficult to meet requirements satisfactorily. One object is the attainment of a closer lamp voltage regulation, and another the provision of a regulator and associated gear which is simple to manufacture, is of robust and reliable character, is little sensitive to temperature influences, and requires little supervision. A further object is to ensure that the battery is always charged at a rate suitable to its state, whether or not the lamps are in circuit.

One example of the invention as applied to train-lighting will now be described: In the accompanying drawings Fig. 1 is a circuit diagram. Fig. 2 an elevation of the apparatus. Fig. 3 a plan thereof and Fig. 4 a cross section on the line 4—4 of Fig. 2.

Referring first to Fig. 1 the installation comprises the following components: A shunt wound dynamo $a$, a battery $b$, load circuits $c$, electro-magnetic switch means $d$ controlling the cutting in and out of the dynamo $a$ and of the so-called lamp resistance, an electro-magnetic regulator $e$, electro-magnetic control means $f$ operative upon said regulator $e$, an output control switch $g$, and a pilot switch $h$ for actuating an electro-magnetic lighting switch $j$.

The switch means $d$ comprises a contact 3 controlled by a solenoid 4 and three contacts 5, 6, 7 controlled by a solenoid with three windings 8, 9, 10. The cut-in contact 6 is in series with a series winding 8 in the positive lead from the dynamo. A series winding 9 is in the positive lead of the battery $b$. A potential winding 10 is connected across the dynamo $a$. The contacts 7 and 3 are short-circuiting contacts across two sections 11, 12 of lamp resistance.

The regulator $e$ comprises a contact 13, the purpose of which will be referred to, regulator contacts 14 connected to tappings in dynamo field resistance 15, a stabilizing resistance 16 and a solenoid comprising main windings 17, 18 and 19. The winding 17 is a potential winding connected between a negative lead 20 and, through a sectional resistance 21, the positive lead from the dynamo. 18 is a series winding shunted by the stabilizing resistance 16 and connected between the battery $b$ and the winding 9. 19 is a winding located in the circuit of the dynamo field winding between it and the resistance 15.

The automatic control means $f$ comprises the resistance 21 tapped at 21$a$ and 21$b$, a contact device 22, 22$a$, 22$b$ and a contact device 23, solenoids 24, 25 respectively controlling said contact devices, and calibrating resistances 32, 33. The tapping 21$a$ is connected to the fixed contact 22$a$ and to one fixed contact of the device 23. The tapping 21$b$ is connected to the other fixed contact of the device 23. The solenoid 24 is connected between the positive side of the load circuits $c$, to which the movable contact 22 is also connected, and the contact 5. The fixed contact associated with said contact 5, which is shunted by a resistance 5$^1$, is connected in turn to the negative main through the resistance 32. The solenoid 25 is connected between the fixed contact 22$b$, and, through the resistance 33, the negative main. Said contact 22$b$ is also connected to the winding 4 which is itself connected, through the contact device 13 and an auxiliary winding 35 on the regulator, to the negative lead 20.

The output control switch $g$ comprises a solenoid 36, a contact device 36$a$ and a calibrating shunt resistance 36$b$. The solenoid 36 is in the main positive lead from the dynamo as is an auxiliary winding 37 on the regulator $e$ when the contact device 36$a$ is open. Closure of said contact device 36$a$ short circuits the winding 37.

The switch $h$ has a manually operated arm 26 connected to the battery positive whereby either the "on" winding 27 or the "off" winding 28 of the electro-magnetic lighting switch $j$ can be energized to open or close the contact 29 in the positive lamp lead.

Assuming a concrete example of a 25 volt battery $b$, the operation of the installation is as follows:—

When the dynamo has reached a speed sufficient to generate 26 to 27 volts, the shunt coil 10 is sufficiently energized to close the cut-in contact 6 and auxiliary contact 5. Current then flows through the series coil 8, the contact 6 and the series coil 9. This strengthens the action of the cut-in solenoid so that it opens the contact 7 which so far has been closed. If the battery $b$ is being charged with the lamps off, the current then passes through the series coil 18 of the regulator and the battery $b$ to the negative terminal of the dynamo. Current also flows through the whole of the resistance 21 and the regulator potential coil 17. It is mainly due to the action of this coil 17 that the regulator functions according to requirements, the dynamo voltage being automatically adjusted so that it remains a little above the battery voltage.

On commencing to charge a completely discharged battery with the lamps off, a large current flows through the series coil 18 this series coil 18 being wound so that it assists the shunt coil 17 to keep the charge to the battery within permissible limits. The function of the stabilizing resistance 16 is to take a fraction of the main battery current; by properly proportioning said resistance, the series coil 18 can be calibrated for a certain maximum current to be allowed to pass to the battery. With the rise of battery voltage, say to about 32 volts, the current in the series coil 18 is reduced owing to the battery being nearly charged, whereas that in the shunt coil 17 is increased, so that finally the shunt coil takes complete control of the regulation, reducing the charging current to a negligble amount. It is desirable that batteries should always be recharged as soon as possible; when freshly run down they can be recharged with this mode of regulation so that they receive 30% of their total charge during the first hour. The charging current may be gradually reduced to about 10% of the maximum at the end of five hours.

The coil 19 is wound to opposse the potential coil 17 and the series coil 18. Below the cut-in voltage, the effects of 17 and 19 are nearly balanced so that the regulator does not tend to move, but as soon as the contact 6 is closed the coil 18 assists the coil 17. The contacts 14 are then opened one at a time as the dynamo speed increases, the contact 13 closing at about the time contact 14a is opened. As the contacts 14 open, more of the resistance 15 is inserted in the circuit of the dynamo field 1 and the coil 19 so as just to keep the dynamo voltage a little higher than the battery voltage and to maintain the charge as required. The coil 19 gradually becomes less effective as the dynamo speeds up owing to the reduction of the field current by the insertion of the resistance 15, the coils 17 and 18 thus becoming proportionately more effective. The reverse takes place when the speed is reduced until all the contacts 14 are closed and the contact 6 cuts out the dynamo.

Assume that the lamps c are now switched on and further that the contact 6 is closed and that 7 is opened. The dynamo current divides at 34, part going to the battery as previously described and the remainder flowing through the lamp resistance 11 and the contact 3 to the lamp load c. Owing to the voltage drop in the lamp resistance 11, the lamp voltage is about 3 volts less than the battery voltage. This defference is necessary so that the battery can be charged without overloading the lamps. This continues until, due to the gradual rise of the battery voltage, the lamp voltage reaches 25 to 26 volts whereat the following operations happen in this order:

Current passing from the positive lamp lead through the coil 24, the switch 5 and the resistance 32 sufficiently excites this coil 24 for the contact 22 to be closed upon the contacts 22a and 22b. Three branch circuits are established. Firstly there is a circuit through contact 22a to the tapping 21a in the resistance 21, thence through the shunt coil 17 to the negative pole. This strengthens the coil 17 as a part of the resistance 21 is short circuited; the regulator therefore automatically inserts more resistance 15 into the circuit of the dynamo field coil 1 and slightly reduces the output.

Secondly a circuit is made from contact 22b through the coil 4 and thence through the contact 13 and coil 35 to the negative lead 20. The resultant opening of the contact 3 causes further lamp resistance 12 to be inserted in the lamp circuit. This causes a further drop of 3 volts in the lamp voltage so that the lamps burn at about 6 volts less than the battery voltage. This insures that the battery will be fully charged even when all the lamps are in use.

Thirdly over the contact 22b a circuit is made through the coil 25 and resistance 33 to the negative main. Owing to its self induction this coil 25 is not, at 26 volts, excited sufficiently rapidly to close contact 23 before the contact 3 opens and the voltage drop referred to occurs, but when the voltage of the lamps rises again to 26 volts or a value slightly thereabove, said coil 25 becomes strong enough to close the contact 23, current then passing from 22a to 23 and thence via 21b and the shunt coil 17 to the negative lead. This still further strengthens the action of the coil 17, as nearly all the resistance 21 is now short circuited; more field resistance 15 is inserted due to more contacts 14 being opened. This reduces the dynamo charges to the battery, which should be nearly charged.

Naturally there is no tendency for current to flow through the coil 24 before the lamp switch contact 29 is closed so that the control device f is never operative except when the lamps are on.

If the train slows down, the regulator gradually closes the contacts 14 in order from the left; (Figure 1) on contact 14a being reached the contact 13 is opened. This de-energizes the coil 4 and closes the contact 3 which cuts out lamp resistance 12. With further slowing down the contacts 5 and 6 are opened and 7 is closed. This cuts out lamp resistance 11, and the load is supplied by the battery. The opening of the contact 6 at the proper moment is accelerated by the reversal of the current in the series coil 9 due to the battery taking over the lamp load from the dynamo. This prevents reverse current passing to the dynamo and ensures an earlier cut-out when lamps are in circuit.

If a small lamp load should be switched on when the battery is well charged and the dynamo is running at average speed, the regulator may regulate at a lower voltage than the battery volts, which may be as high as 27 at the moment. There will be a discharge from the battery to the lamps for a few minutes, the dynamo being cut out by the opening of the contact 6; when the peak of the battery voltage has discharged down to about 25 volts, the contact 6 will close and the regulator will re-adjust itself and the dynamo take up the load again. Although the contact 5 will open with the contact 6, sufficient current will pass through the resistance 5' to the solenoid 24 to keep the contact 22 closed until the contact 5 again closes. Also when cut-out occurs as the dynamo slows down the solenoid 24 will remain sufficiently excited, due to the current passing through the resistance 5', to keep the contact 22 closed until the lamp voltage falls to 24. This, with full lamp load, takes place almost simultaneously with the cut-out, but, with a small lamp load and the battery well charged, a few minutes may elapse before the contact 22 is opened.

When the dynamo is cut out, the lamp current passes from the battery positive through the series coil 18 to the series coil 9, then through the closed contacts 7 and 3 and the contacts 29 of the lighting switch to the lamps. When the dynamo is running at normal speed and the lamps are switched on, the current taken by the lamps does not reduce the charge to the battery, as each lamp switched on opens an additional easy path for the current, the dynamo generating more current to meet the demand.

The function of the coil 35 is to make the action of the contact 13 definite both when opening and shutting. As soon as current passes through the contact 13 the coil 35 is energized to assist the shunt coil 17, thereby definitely closing the contact 13 while leaving the shunt coil 17 free to make further adjustments when necessary. Opening of the contact 13 resultant upon reduction of the speed of the dynamo de-energizes the coil 35 and ensures complete opening of said contact 13.

It may be desirable to couple lighting, battery and other mains through from coach to coach of a train. In these circumstances the failure of a number of dynamos on the train, increasing the load on the remaining dynamos, might cause the fuses of the latter to blow unless their output is under control. In the present arrangement this control is provided by the coil 37 on the regulator. This coil is normally short circuited by the contact 36a but when the output current through the coil 36 reaches a predetermined amperage the coil 36 opens the contact 36a whereby the coil 37 becomes operative to assist the shunt coil 17 in limiting the dynamo output.

Referring now more particularly to Figs. 2-4 the cores of the several solenoids are constituted as pistons. The plunger core 40 of the regulator (Fig. 4) works in a brass tube 41 which is soldered to a core part 42 screw threaded for connection in an adjustable manner to a supporting frame 47; this ensures air tightness except for leakage past the piston 40, thereby establishing a dash pot action, while also ensuring that the tube shall be effectually held against accidental movement without having to be clamped and possibly injured by mechanical means.

The seven solenoids 4, (8—9—10), (17—18—19—35—37) 24, 25, 27, 28 and the associated components are all mounted on the single robust frame 47 which is carried by feet 48 within a water and dust tight casing of which the base 49 is alone shown. In this way the parts are largely relieved of twisting strain. The contact 13 is a spring blade having a natural bias towards an adjusting contact screw 50 and is moved away from the screw by a tapered bar 51 which is operated (Fig. 4) by the solenoid piston 40 and serially disengages the contacts 14, in order from the left, from a common short-circuiting contact 52. The variation of the resistance of the path over a contact 14 with the variation of mechanical pressure as the contact 14 is moved away from the contact 52 makes the resistance variation effected by the regulator a gradual one. The contact 52 is a length of carbon attached by screws 52a to a carrier 52b of angle section mounted to slide on a support 52c of similar section and held against separation therefrom by screws 52d, Fig. 3, the heads of which take into slots 52e in the support 52c.

A link 53 pivoted to a lug on the carrier 52b couples the contact 52 to an arm 54 pivoted at 54a and encircled by a spring 55 against the action of which it can be moved towards the right by a lever 56 loosely engaged by the piston of the lights "off" switch solenoid 27. Thus the contact 52 is reciprocated every time the lights "off" solenoid is energized and de-energized, thereby keeping the contacts clean without necessitating a special magnet for the purpose. When the "on" solenoid 28 is energized and the brush 29 consequently raised and closed, it is held in raised position until solenoid 27 is energized by a spring or gravity loaded locking detent 57 pivoted at 58, the position of this pivot being so chosen that the detent, when thus in engagement with the brush, tends to be further drawn into holding position, the grip increasing with the pressure. The detent 57 is retracted by a lever 59 which is depressed by an angle extension 60 of a lever 61 which is depressed when the piston of solenoid 27 rises and rocks the arm 56. 62 is an emergency push for tripping the piston of the solenoid 27 when it may be desired to open the switch 29 manually.

As most of the wear due to the action of the current takes place on the positive contact, the long main carbon contact 52 is made positive to the small lifting contacts 14, as it is more easily replaced and can be turned to present new working faces, being rectangular in section. All the working faces of the regulator contacts are in the vertical plane to allow dust to fall freely away.

I claim:—

1. An electrical installation such as a train lighting installation, comprising in combination with a dynamo connected to a battery and to a load circuit through a load switch, a field circuit for the dynamo, a variable resistance in said field circuit, an electro-magnetic regulator operative to vary said resistance and having its principal winding connected in shunt across the dynamo, resistance in circuit with said winding for limiting its excitation while the load switch is open and the battery alone is receiving current from the dynamo or, the load switch being closed, while the load voltage is below a predetermined value, and automatic relay means connected to said load circuit and having contacts connected to the last named resistance, said relay means being operative in succession for reducing said resistance on the load voltage attaining said value and for further reducing the same on said voltage subsequently attaining substantially the same value.

2. An electrical installation comprising in combination with a dynamo connected to a battery and to a load circuit through a load switch, a field circuit for the dynamo, a resistance in said field circuit, an electro-magnetic regulator operative to vary said resistance and comprising a predominating shunt winding across the dynamo and a series winding in circuit with the battery, resistance in series with said shunt winding for limiting its excitation while the load switch is open and the battery alone is receiving current from the dynamo or, when the load switch is closed, while the load voltage is below a predetermined value and automatic relay means connected to said load circuit and having contacts connected to the last named resistance, said relay means being operative in succession for reducing said resistance on the load voltage attaining said value and for further reducing the same on said voltage subsequently attaining substantially the same value.

3. An electrical installation comprising in combination with a dynamo connected to a battery and load, a field circuit for the dynamo, a resistance in said circuit, an electro-magnetic regulator operative to vary said resistance and comprising a predominating shunt winding across the dynamo and a series winding connected in the field circuit, resistance in series with said shunt winding for limiting its excitation while the battery alone is receiving current from the dynamo or the load voltage is below a predetermined value, and automatic relay means connected to said load circuit and having contacts connected to the last named resistance, said relay means being operative in succession for reducing said resistance on the load voltage attaining said value and for further reducing the same on said voltage subsequently attaining substantially the same value.

4. An electrical installation comprising in combination with a dynamo connected to a battery and a load circuit, a field circuit for the dynamo, a resistance in said circuit, an electro-magnetic regulator operative to vary said resistance and comprising a predominating shunt winding across the dynamo, a series winding connected in the field circuit and a series winding in circuit with the battery, resistance in series with said shunt winding for limiting its excitation while the battery alone is receiving current from the dynamo or the load voltage is below a predetermined value and automatic relay means connected to said load circuit and having contacts connected to the last named resistance, said relay means being operative in succession for reducing said resistance on the load voltage attaining said value and for further reducing the same on said voltage subsequently attaining substantially the same value.

5. An electrical installation comprising a dynamo connected to a battery and a load circuit, a field circuit for the dynamo, resistance in said field circuit, a regulator comprising a principal shunt winding across the dynamo, an auxiliary shunt winding connected across the load circuit, contact means operative to vary said resistance and a contact arranged in series with said auxiliary shunt winding and operatively connected with the regulator in such manner as to be closed at a predetermined stage of the action of the regulator, such closure completing the shunt circuit of the auxiliary winding, imparting a forward impulse in the action of the regulator and insuring definite closure of said contact, resistance in series with the shunt winding for limiting its excitation, and electro-magnetic relay means connected to said load circuit and adapted for reducing the last named resistance on the load voltage attaining a predetermined value and for further reducing the same on said voltage subsequently attaining substantially the same value.

6. An electrical installation as claimed in claim 4, comprising in addition an auxiliary shunt regulator winding connected across the load circuit, and an auxiliary contact device, in series with said winding, and operatively connected with the regulator in such manner at a predetermined stage of the action of the regulator, said winding insuring clearly defined operation of said contact substantially as described.

7. An electrical installation comprising a dynamo, main leads connecting the dynamo to a battery and a load circuit, a field circuit for the dynamo, resistance in said field circuit; a regulator comprising a shunt winding across the dynamo, and contact means operative to vary said resistance; resistance in series with the shunt winding for limiting its excitation, electro-magnetic control means connected to said load circuit and adapted for reducing the last named resistance on the load voltage attaining a predetermined value and for further reducing the same on said voltage subsequently attaining a predetermined value, and an emergency output-limiting means comprising a series winding on the regulator connected in series with one of said main leads, and an automatic short-circuiting device normally maintaining a short circuit across said series winding and constructed to open and divert the current through said winding upon the attainment of a predetermined output.

8. An electrical installation as claimed in claim 4, comprising in addition an emergency output-limiting regulator-winding in series with one of the main leads connecting the dynamo to the battery and load circuit and an automatic short-circuiting device normally maintaining a short circuit across said output-limiting winding and constructed to open and divert the current through said winding upon the attainment of a predetermined output.

9. Electrical regulating means for an installation embodying a dynamo having a field circuit and connected to a battery and a load circuit, comprising a sectional resistance in the field circuit, a shunt solenoid winding across the dynamo, an armature influenced by said winding, short circuiting contacts consisting of a carbon bar and movable members connected across sections of said resistance, actuating means operatively connected with said armature and engaging said movable members for opening and closing said contacts in succession, each contact being opened or closed slowly so that the resistance in circuit is modified gradually, resistance in series with said shunt winding for limiting its excitation, and electro-magnetic relays connected to said load circuit and having contacts connected to the last named resistance, said relays being operative in succession for reducing said resistance on the load voltage attaining a predetermined value and for further reducing the same on said voltage subsequently attaining substantially the same value.

10. Electrical regulating means as claimed in claim 9, in combination with an automatic switch actuated periodically in the operation of the installation, mechanism for imparting a periodical sliding motion to the carbon bar-contact to keep the same clean, and an operative connection between said mechanism and the automatic switch.

11. An electrical installation comprising in combination with a dynamo connected to a field circuit and, through a cut-in switch, to a battery, and a load, a resistance in said circuit, an electro-magnetic regulator operative to vary said resistance and having its principal winding connected in shunt across the dynamo, resistance in circuit with said winding for limiting its excitation while the battery alone is receiving current from the dynamo or the load voltage is below a predetermined value, automatic control means connected to said load circuit and adapted for reducing the last named resistance on the load voltage attaining said value and for further reducing the same on the load voltage subsequently attaining a predetermined value, a resistance in two parts in series with the load, an auxiliary contact on the cut-in switch operative for cutting one part of said resistance in and out of circuit, and an electro-magnetic device connected to said load circuit and operative for cutting the other part of said resistance in and out of circuit at a predetermined stage of the regulation.

12. An electrical installation as claimed in claim 5, comprising in addition resistance in two parts connectible in series with the load and an electro-magnetic device connected to the load circuit through the auxiliary contact device and operative, when excited upon closure of said contact device, to cut in one part of said resistance in series with the load.

13. An electrical installation comprising in combination with a dynamo connected to a battery and a load through a cut-in switch, a field circuit for said dynamo, a resistance in said circuit, an electro-magnetic regulator operative to vary said resistance and having its principal winding connected in shunt across the dynamo, resistance in circuit with said winding for limiting its excitation while the battery alone is receiving current from the dynamo or the load voltage is below a predetermined value, successively excited electro-magnetic relay means the excitation circuits of which are connected to the load circuits, a subsidiary contact located in the excitation circuit of the first excited of said relay means and opened and closed by and together with the cut-in switch, and a resistance shunt across said contact, the first excited relay means being operative for reducing the resistance in circuit with the principal regulator winding on the load voltage attaining said predetermined value and the second excited relay means for further reducing the same resistance on said voltage subsequently attaining a predetermined value; the current passed by the shunt resistance is insufficient to operate the first excited relay means but sufficient to hold said relay means in the operative condition provided that the load voltage exceeds a certain minimum.

HERBERT FOALE.